(12) United States Patent
Brothers

(10) Patent No.: US 9,842,410 B2
(45) Date of Patent: Dec. 12, 2017

(54) IMAGE COMPRESSION AND DECOMPRESSION WITH NOISE SEPARATION

(71) Applicant: Samsung Electronics Co., Ltd., Gyeonggi-do (KR)

(72) Inventor: John W. Brothers, Calistoga, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 106 days.

(21) Appl. No.: 14/743,000

(22) Filed: Jun. 18, 2015

(65) Prior Publication Data

US 2016/0371857 A1   Dec. 22, 2016

(51) Int. Cl.
| | |
|---|---|
| *G06K 9/46* | (2006.01) |
| *G06T 9/00* | (2006.01) |
| *G06T 5/00* | (2006.01) |
| *G06K 9/40* | (2006.01) |
| *H04N 19/17* | (2014.01) |
| *H04N 19/82* | (2014.01) |
| *H04N 19/85* | (2014.01) |
| *G06T 7/11* | (2017.01) |
| *G06T 7/174* | (2017.01) |

(52) U.S. Cl.
CPC .............. *G06T 9/00* (2013.01); *G06K 9/40* (2013.01); *G06T 5/002* (2013.01); *G06T 7/11* (2017.01); *G06T 7/174* (2017.01); *H04N 19/17* (2014.11); *H04N 19/82* (2014.11); *H04N 19/85* (2014.11)

(58) Field of Classification Search
USPC ............. 345/426, 531; 348/222.1, 241, 606; 375/240.01, 354; 382/232, 233, 238; 704/200.1
See application file for complete search history.

(56) References Cited

U.S. PATENT DOCUMENTS

| | | | | |
|---|---|---|---|---|
| 5,577,131 | A * | 11/1996 | Oddou ................ | G06K 9/342 382/173 |
| 5,805,221 | A * | 9/1998 | Lee ..................... | G06T 9/20 375/240.1 |
| 5,870,703 | A * | 2/1999 | Oikawa ............... | H04B 1/665 704/200.1 |
| 6,593,925 | B1 * | 7/2003 | Hakura ............... | G06T 13/20 345/426 |
| 6,961,083 | B2 | 11/2005 | Obrador et al. | |
| 6,990,252 | B2 * | 1/2006 | Shekter .............. | G06K 9/40 358/453 |

(Continued)

FOREIGN PATENT DOCUMENTS

| | | |
|---|---|---|
| EP | 1260094 A2 | 11/2002 |
| EP | 1681849 A2 | 7/2006 |

OTHER PUBLICATIONS

Galerne, B. et al., "Gabor Noise by Example," In ACM Trans. on Graphics (TOG), vol. 31, No. 4, Art. 73, 9 pg., 2012.

(Continued)

*Primary Examiner* — Xuemei Chen
(74) *Attorney, Agent, or Firm* — Renaissance IP Law Group LLP

(57) ABSTRACT

Image processing may include separating a noise component from an original image resulting in a de-noised image and determining a noise parameterization for the noise component. The de-noised image and the noise parameterization may be compressed.

17 Claims, 5 Drawing Sheets

(56) References Cited

U.S. PATENT DOCUMENTS

| | | | |
|---|---|---|---|
| 7,102,638 B2 | 9/2006 | Raskar et al. | |
| 7,483,486 B2 * | 1/2009 | Mantiuk | H04N 19/46 375/240.01 |
| 7,835,562 B2 * | 11/2010 | Avinash | G06T 5/50 382/132 |
| 7,869,980 B2 * | 1/2011 | Casler | H04N 19/60 375/354 |
| 8,023,761 B2 | 9/2011 | Rhee | |
| 8,120,679 B2 | 2/2012 | Ishiga | |
| 8,155,464 B2 | 4/2012 | Sasahara et al. | |
| 8,213,500 B2 * | 7/2012 | Oh | H04N 19/80 348/606 |
| 8,218,882 B2 * | 7/2012 | Sato | H04N 19/30 382/232 |
| 8,265,401 B2 | 9/2012 | Yoshimura | |
| 8,274,577 B2 * | 9/2012 | Thorell | H04N 19/86 348/222.1 |
| 8,339,516 B2 | 12/2012 | Lei et al. | |
| 8,368,956 B2 * | 2/2013 | Campbell | H04N 1/40062 358/1.9 |
| 8,682,088 B2 | 3/2014 | Uchida et al. | |
| 8,755,837 B2 | 6/2014 | Rhoads et al. | |
| 8,761,527 B2 * | 6/2014 | Domanski | G06K 9/00 382/232 |
| 9,378,560 B2 * | 6/2016 | Iourcha | G06T 9/00 |
| 2007/0160298 A1 * | 7/2007 | Murakami | H04N 19/176 382/238 |
| 2008/0205518 A1 * | 8/2008 | Wilinski | H04N 19/105 375/240.08 |
| 2010/0046845 A1 * | 2/2010 | Wedi | H04N 19/619 382/233 |
| 2010/0177973 A1 | 7/2010 | Wedi et al. | |
| 2011/0141368 A1 | 6/2011 | Wallace et al. | |
| 2012/0076430 A1 * | 3/2012 | Segall | G06T 5/004 382/233 |
| 2012/0308146 A1 | 12/2012 | Uchida et al. | |
| 2015/0312495 A1 * | 10/2015 | Pan | G06T 3/00 348/241 |
| 2015/0379684 A1 * | 12/2015 | Ramani | G06T 11/40 345/531 |

OTHER PUBLICATIONS

"Image Segmentation," [online] Wikipedia, the Free Encyclopedia, modified Apr. 17, 2015 [retrieved Apr. 29, 2015], retrieved from the Internet: <https://en.wikipedia.org/wiki/Image_segmentation>, 18 pg.

Lagae, A., "A Survey of Procedural Noise Functions," In Computer Graphics Forum, vol. 29, No. 8, pp. 2579-2600, Blackwell Publishing Ltd, 2010.

Lagae, A. et al., "Procedural Iotropic Stochastic Textures by Example," In Computers & Graphics, vol. 34, No. 4, pp. 312-321, 2010.

Tandianus, J.E. et al., "Video Cataloguing and Browsing," In Proc. of the Pan-Sydney Area Workshop on Visual Information Processing, vol. 11, pp. 39-45, Australian Computer Society, Inc., 2001.

* cited by examiner

IMAGE COMPRESSION AND DECOMPRESSION WITH NOISE SEPARATION

TECHNICAL FIELD

This disclosure relates to image processing and, more particularly, to image compression and decompression.

BACKGROUND

Image compression seeks to reduce the size of image data for more efficient transfer and/or storage of the image. The size of image data may be reduced, for example, by attempting to reduce irrelevant and/or redundant portions of the image data. Conventional image compression techniques provide acceptable levels of compression for a variety of different image types. In some cases, however, conventional image compression techniques perform in a sub-optimal manner.

For example, conventional image compression techniques tend to perform poorly on images that include a textured area. Examples of textured areas may include, but are not limited to, mottled carpet, grass, stone, building facades, paved surfaces, and the like. In some cases, when compressing an image with a textured area, conventional image compression techniques may degrade or eliminate the texturing of the area. In other cases, to avoid degradation of the textured area, conventional image compression techniques encode the image at a higher bit rate resulting in a lesser amount of compression and larger file size than may be desired.

SUMMARY

A method may include separating a noise component from an original image resulting in a de-noised image, determining a noise parameterization for the noise component, and compressing the de-noised image and the noise parameterization.

A system may include a noise processing circuit configured to separate a noise component from an original image resulting in a de-noised image, a noise parameterization circuit configured to determine a noise parameterization for the noise component, and a compression circuit configured to compress the de-noised image and the noise parameterization.

A system may include a decompressor configured to decompress a compressed de-noised image and a compressed noise parameterization for the de-noised image, a noise generator configured to generate noise according to the noise parameterization, and a combine circuit configured to combine the noise generated by the noise generator and at least a portion of the de-noised image.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown.

Various aspects and advantages will become apparent upon review of the following detailed description with reference to the drawings.

DETAILED DESCRIPTION

Figure 1:
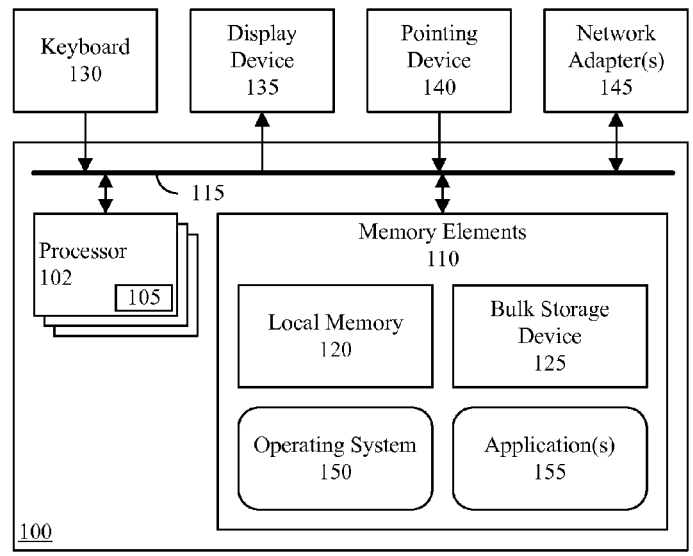
FIG. 1 is a block diagram illustrating an exemplary architecture for a data processing system.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to image processing and, more particularly, to image compression and decompression. In accordance with the inventive arrangements disclosed herein, images that have textured regions may be processed by considering the texturing independently, or separately, from the image. The texture within an original image may be described by a noise function and one or more parameters for the noise function, collectively referred to as a "noise parameterization." Characteristics of the texture, e.g., noise, described by the noise parameterization may be removed from the original image resulting in a de-noised version of the original image called the de-noised image. The noise parameterization is compact in size for purposes of storage. The de-noised image and the noise parameterization may be compressed and stored in memory for subsequent use.

The stored de-noised image may be retrieved from memory and decompressed. The noise parameterization for the de-noised image may also be retrieved from memory and decompressed. The noise parameterization may be used to generate noise that, when combined to the de-noised image, generates a texture that approximates the look of the original texture removed from the original image. While described with reference to the de-noised image as a whole, the processes described herein may be applied to one or more specific regions of the de-noised image if desired.

The resulting combination of the de-noised image and generated noise produce a high quality texture for the image. The texture has characteristics that are the same as, or similar to, those initially determined from the original image. While the texture is of high quality, the texture within the constructed version of the original image is different from the texture within the original image. The generated texture and the original texture differ in ways that are unimportant to a user.

As an example, consider an original image that includes a region with grass. The texture of the grassy region may be accurately described by a particular noise function and parameters. The de-noised image and the noise parameterization generated from the original image may be stored in memory in compressed form. When retrieved from memory, the noise parameterization may be used to generate the texture of the grassy region, which may be combined with the de-noised image. The resulting constructed version of the original image, referred to as the constructed image, has a texture in the grassy region that looks like, e.g., approximates, the texture of the grassy region in the original image. The texture in the constructed image, however, may differ from the texture in the original image when compared on a pixel by pixel basis. For example, a comparison of the original image and the constructed image may reveal that individual blades of grass in the texture region of the constructed image may differ from individual blades of grass in the original image. To a user viewing the constructed image, the texture of the grassy region in the constructed image looks like the grassy region in the original image.

The techniques described within this disclosure may also be used to create images, e.g., computer-generated images, and apply textures to the images. For example, a graphic artist may create an image and select or create a noise function to be applied to one or more regions of the image. The noise function, in combination with parameters for the noise function, may be used to generate a texture that may be applied to the image. The resulting image, also referred to herein as a constructed image, may be compressed efficiently since the texture may be efficiently separated from the image and stored compactly in the form of a noise parameterization. It should be appreciated that a user may also edit an existing, e.g., non-computer-generated, image through application of texture as described herein.

The inventive arrangements described herein may be implemented as a method or process performed by a data processing system and/or an electronic circuit such as an integrated circuit (IC) within a data processing system. The IC, for example, may be a processor. In another aspect, the inventive arrangements may be implemented as a system, e.g., an apparatus, such as an electronic circuit. The electronic circuit may be implemented as an IC that may be implemented as, or include, a processor. Examples of processors may include, but are not limited to, central processing units (CPUs), graphics processing units (GPUs), controllers, digital signal processors (DSPs), or the like. Further, the processor may be part of a larger system such as a programmable IC, a data processing system or other computing and/or communication device, an entertainment and/or gaming system or console, an automobile, etc.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary architecture 100 for a data processing system. Architecture 100 may be used to implement any of a variety of different systems and/or devices that include a processor and memory capable of performing the operations described within this disclosure. In some cases, the particular system and/or device implemented using architecture 100 may include fewer components or more components than shown. Further, the particular operating system and/or application(s) included may vary. Exemplary systems that may use architecture 100 may include, but are not limited to, embedded systems, mobile phones, personal computing devices such as desktop, laptop, and/or tablet computing devices, servers, gaming consoles, entertainment systems, display devices, and the like.

As pictured, architecture 100 includes at least one processor 102. Examples of processor 102 may include, but are not limited to, a CPU, a DSP, a GPU, a controller, a field programmable gate array or other programmable IC, or the like. Processor 102 includes an image processing system 105 implemented as circuitry and configured to perform image processing. In one aspect, image processing system 105 may be configured to extract a noise component from an image, generate a de-noised image, perform compression on the various components generated from the image, and store the compressed components in a memory. Image processing system 105 may also retrieve the compressed components from the memory, decompress the compressed components, generate noise approximating a texture, and combine the texture to the de-noised image.

Processor 102 and/or image processing system 105 may be coupled to memory elements 110 through a system bus 115 or other suitable circuitry. Architecture 100 may store program code within memory elements 110. Processor 102 executes the program code accessed from memory elements 110 via system bus 115. Memory elements 110 include one or more physical memory devices such as, for example, a local memory 120 and one or more bulk storage devices 125. Local memory 120 refers to random access memory (RAM) or other non-persistent memory device(s) generally used during actual execution of the program code. Bulk storage device 125 may be implemented as a hard disk drive (HDD), a solid state drive (SSD), or another persistent data storage device. Architecture 100 may also include one or more cache memories (not shown) that provide temporary storage of at least some program code in order to reduce the number of times program code must be retrieved from bulk storage device 125 during execution.

Input/output (I/O) devices such as a keyboard 130, a display device 135, and a pointing device 140 may optionally be coupled to architecture 100. In some cases, one or more of the I/O devices may be combined as in the case where a touchscreen is used as display device 135. In that case, display device 135 may also implement keyboard 130 and pointing device 140.

The I/O devices may be coupled to architecture 100 either directly or through intervening I/O controllers. One or more network adapters 145 may also be coupled to architecture 100 to enable architecture 100 to become coupled to other systems, computer systems, remote printers, and/or remote storage devices through intervening private or public networks. Modems, cable modems, Ethernet cards, wireless transceivers, and/or wireless radios are examples of different types of network adapter 145 that may be used with architecture 100. Depending upon the particular device implemented using architecture 100, the specific type of network adapter 145, or network adapters as the case may be, will vary.

As pictured in FIG. 1, memory elements 110 may store an operating system 150 and optionally one or more applications 155. In one aspect, operating system 150 and application(s) 155, being implemented in the form of executable program code, are executed by architecture 100. As such, operating system 150 and application(s) 155 may be considered an integrated part of architecture 100. Operating system 150, application(s) 155, and any data items used, generated, and/or operated upon by architecture 100 are functional data structures that impart functionality when employed as part of a system implemented using architecture 100.

In some cases, architecture 100 may include operational software where operating system 150 and applications 155 are implemented as a single, larger program. For example, in the case where architecture 100 is used to implement an embedded system, the functions performed by operating system 150 and application(s) 155 may be combined and implemented as an integrated program.

Architecture 100 is presented for purposes of illustration only. In other examples, architecture 100 may include a processor 102 such as a CPU and a separate GPU. In general, a GPU is optimized for manipulating computer graphics, performing image processing, and the like. In some cases, the processor, e.g., the CPU, may offload particular tasks ordinarily performed by the CPU to the GPU for processing. In still other examples, the GPU may be implemented on a separate circuit board than processor 102. Further, the GPU may have separate memory elements, e.g., separate local memory, than processor 102. The GPU may include image processing system 105 instead of processor 102. In another example, both processor 102 and the GPU may include image processing system 105.

Figure 2:
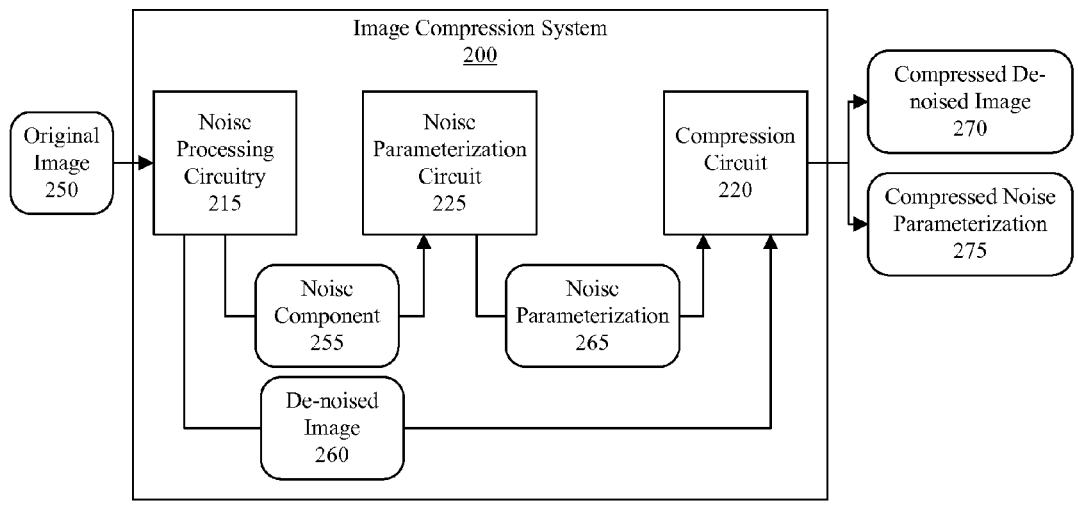
FIG. 2 is a block diagram illustrating an exemplary image compression system.

FIG. 2 is a block diagram illustrating an exemplary image compression system 200. In one aspect, image compression system 200 may be an exemplary implementation of image processing system 105 of FIG. 1. In another aspect, image processing system 105 may include image compression system 200 as one system, while also including one or more other systems.

Image compression system 200 may include a noise processing circuit 215, a noise parameterization circuit 225, and a compression circuit 220. Noise processing circuit 215 may receive an original image 250. Noise processing circuit 215 may be configured to separate a noise component 255 from original image 250 resulting in a de-noised image 260. Noise processing circuit 215 may provide noise component 255 to noise parameterization circuit 225 and provide de-noised image 260 to compression circuit 220.

Noise parameterization circuit 225 may be configured to determine a noise parameterization 265 for noise component 255. In one aspect, noise parameterization circuit 225 may use a "noise by example" processing technique. One example of a "noise by example" processing technique that may be used to determine the noise function and parameters for the noise function is described within Galerne, et al., "Gabor Noise by Example," ACM Transactions on Graphics (TOG)—Proceedings of ACM SIGGRAPH 2012, vol. 31, issue 4, (July 2012). In another aspect, while "Gabor Noise by Example" discloses the use of Gabor noise function, an Anistropic noise function may also be used.

Noise parameterization circuit 225 may provide noise parameterization 265 to compression circuit 220. Compression circuit 220 may be configured to compress de-noised image 260 and noise parameterization 265 thereby generating compressed de-noised image 270 and compressed noise parameterization 275. Compressed de-noised image 270 and compressed noise parameterization 275 may be stored in a memory.

In one aspect, de-noised image 260, which lacks high frequency noise, or texture, may be compressed to a greater degree than original image 250. Noise parameterization 265 is already in a compact form and may be compressed further. Image compression system 200 may achieve greater compression than other conventional image compression techniques. Still, when the compressed data is read from memory and rendered, the character of the texture is maintained.

Figure 3:
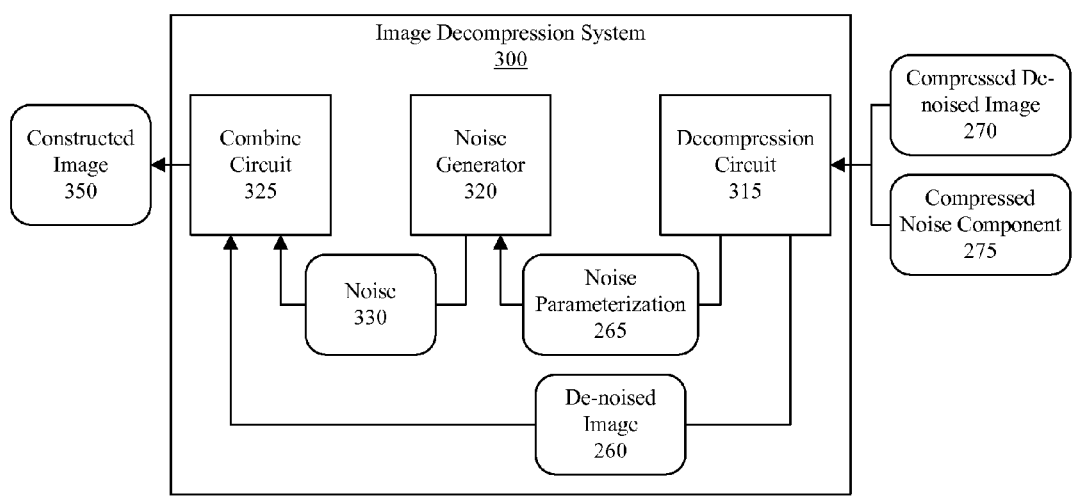
FIG. 3 is a block diagram illustrating an exemplary image decompression system.

FIG. 3 is a block diagram illustrating an exemplary image decompression system 300. In one aspect, image decompression system 300 may be an exemplary implementation of image processing system 105 of FIG. 1. In another aspect, image processing system 105 may include image decompression system 300 as one system, while also including one or more other systems. For example, image processing system 105 may include both image compression system 200 and image decompression system 300.

Image decompression system 300 may include a decompression circuit 315, a noise generator 320, and a combine circuit 325. Compressed de-noised image 270 and compressed noise parameterization 275 may be retrieved from a memory and received by decompression circuit 315. Decompression circuit 315 decompresses compressed de-noised image 270 and compressed noise parameterization 275 to generate, or recover, noise parameterization 265 and de-noised image 260. Noise parameterization 265 is provided to noise generator 320. Noise generator 320 generates noise 330 using noise parameterization 265.

Combine circuit 325 receives noise 330 and de-noised image 260. Combine circuit 325 combines noise 330 with de-noised image 260 to generate a constructed image 350. As one example, combine circuit 325 may add noise 330 with de-noised image 260. As discussed, the texture within constructed image 350 appears similar to the texture in original image 250, but is not identical.

Figure 4:
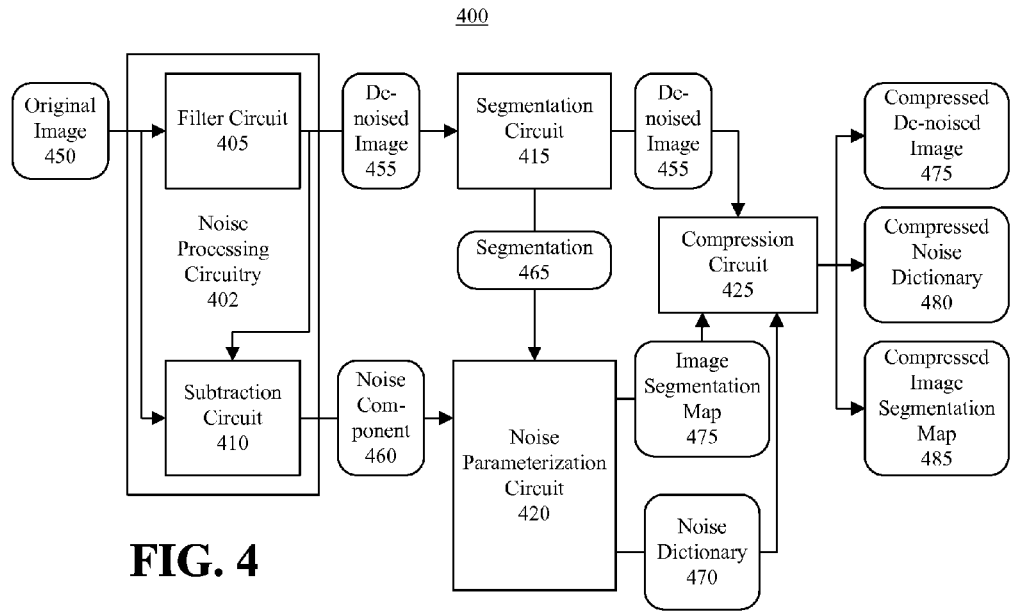
FIG. 4 is a block diagram illustrating another exemplary image compression system.

FIG. 4 is a block diagram illustrating another exemplary image compression system 400. In one aspect, image compression system 400 may be an exemplary implementation of image processing system 105 of FIG. 1. In another aspect, image processing system 105 may include image compression system 400 as one system, while also including one or more other systems. As pictured, image compression system 400 may include a noise processing circuit 402, a segmentation circuit 415, a noise parameterization circuit 420, and a compression circuit 425.

An original image 450 is provided to noise processing circuitry 402. In one embodiment, noise processing circuitry 402 may include a filter circuit 405 and a subtraction circuit 410. Original image 450 may include one or more regions that include texture. For example, original image 450 may include a grassy region, a roadway or sidewalk, etc. Each of the exemplary regions may be considered a different type of texture. Each texture may be considered a different type of noise that may be separated and/or removed from original image 450.

Referring to FIG. 4, original image 450 is provided as an input to filter circuit 405 and to subtraction circuit 410. Filter circuit 405 may filter the original image resulting in a de-noised image 455. For example, filter circuit 405 may perform a de-noise operation on original image 450 and generate de-noised image 455. De-noised image 455 is a version of original image 450 with noise, detectable by filter circuit 405, removed. In one embodiment, filter circuit 405 may be implemented as a bilateral filter. In another embodiment, filter circuit 405 may be implemented as a local Laplacian filter. It should be appreciated, that any of a variety of different filter types may be used to extract noise from original image 450. The particular type of filter used, however, may be one that preserves edges within original image 450. Accordingly, the preserved edges will still be included within de-noised image 455.

Filter circuit 405 outputs de-noised image 455 to segmentation circuit 415 and to subtraction circuit 410. Subtraction circuit 410 subtracts de-noised image 455 from original image 450 to generate noise component 460. Subtraction circuit 410 outputs noise component 460 to noise parameterization circuit 420.

In one example, the particular implementation of noise processing circuit 402 described with reference to FIG. 4 may also be used to implement noise processing circuit 215 of FIG. 2.

Segmentation circuit 415 segments de-noised image 455 into a plurality of different regions. In one embodiment, segmentation circuit 415 may segment de-noised image 455 into a plurality of different regions where the regions are rectangular blocks. For example, the blocks may be a fixed number of pixels in width and a fixed number of pixels in height. In one exemplary implementation the regions may be 16×16 pixels.

In another embodiment, segmentation circuit 415 may segment de-noised image 455 into a plurality of irregular shaped regions. Any of a variety of known image segmentation techniques may be used to generate the irregular shaped regions. As defined herein, the term "irregular shaped region" means that the shape of a region may not be rectangular and/or may differ from the shape of another region or of each other region. The boundary or border of an irregular shaped region, for example, may be determined by detected edges. Exemplary image segmentation techniques may include, but are not limited to, thresholding clustering methods (e.g., K-means), compression-based methods, histogram-based methods, or the like.

Segmentation circuit 415 generates segmentation 465 that may be provided to noise parameterization circuit 420. In one aspect, segmentation 465 may be a mapping of the various regions determined from segmenting de-noised image 455. Segmentation circuit 415 may also provide de-noised image 455 to compression circuit 425.

Noise parameterization circuit 420 receives noise image 460 and segmentation 465. It should be appreciated that segmentation 465, as determined from de-noised image 455, also correlates, or maybe overlaid upon, noise component 460. For example, noise component 460 may be a "noise image." Each region defined by segmentation 465 from de-noised image 455 may correlate, on a one-to-one basis, with a region of noise component 460. For each region of noise component 460 that corresponds to a region specified by segmentation 465, noise parameterization circuit 420 may determine one or more noise parameterizations. As previously noted, a noise parameterization may specify a noise function and one or more parameters that may be used by that noise function. The noise parameterization(s) may be determined as previously described within this specification.

In one embodiment, noise parameterization circuit 420 may determine one noise parameterization for each region. In another embodiment, noise parameterization circuit 420 may determine one, or more, noise parameterizations for each region depending upon the characteristics of each particular region. For example, a region may include more than one texture. In that case, noise parameterization circuit 420 may determine a noise parameterization for each different texture, e.g., for each sub-region of the region having a particular texture, thereby resulting in a plurality of noise parameterizations for that particular region.

Noise parameterization circuit 420 generates a noise dictionary 470 and an image segmentation map 475. In one embodiment, noise dictionary 470 may be implemented as a data structure, e.g., a file, specifying the noise parameterizations generated for each region of segmentation 465. For example, noise dictionary 470 may include the noise function and parameter(s) (e.g., the noise parameterization) as a pair for one or more or for each different region of noise component 460.

Image segmentation map 475 may be implemented as a data structure, e.g., a file, specifying regions and a corresponding reference for each region that indicates, or points to, a particular noise parameterization from noise dictionary 470 for that region of noise component 460 (and, as such, for de-noised image 455). In one aspect, image segmentation map 475 may specify the particular noise parameterization to be used on a per-pixel basis. For those regions associated with more than one noise parameterization, image segmentation map 475 may specify a reference to each of the noise parameterizations, in noise dictionary 470, for the region. Further, for those regions associated with a plurality of noise parameterizations, image segmentation map 475 may specify the location and/or contour of the sub-region within the region for each respective noise parameterization. Also, within a region or sub-region, parameters might be interpolated to vary the noise across the region.

Noise parameterization circuit 420 outputs noise dictionary 470 and image segmentation map 475 to compression circuit 425. Compression circuit 425 may compress de-noised image 455, noise dictionary 470, and image segmentation map 475. As pictured, compression circuit 425 outputs compress de-noised image 475, compressed noise dictionary 480, and compressed image segmentation map 485. In one embodiment, compression circuit 425 may store compressed de-noised image 475, compressed noise dictionary 480, and compressed image segmentation map 485 within memory for subsequent recall.

Figure 5:
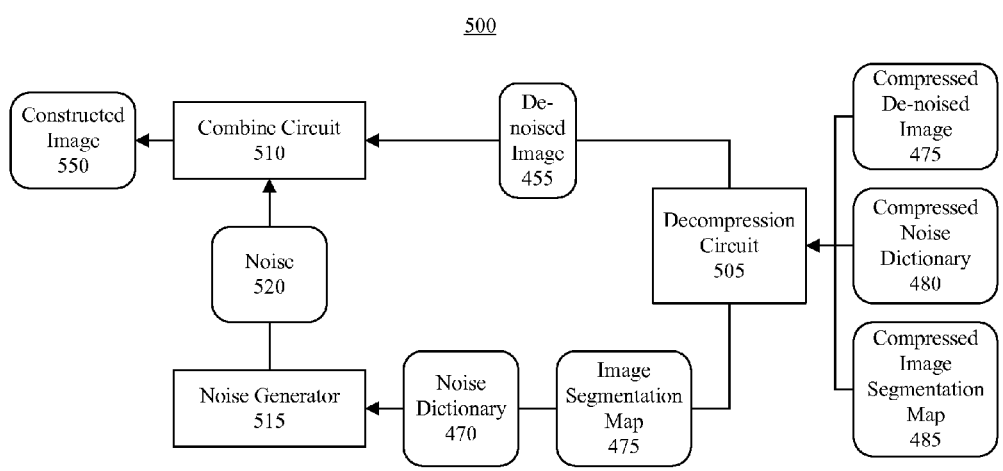
FIG. 5 is a block diagram illustrating another exemplary image decompression system.

FIG. 5 is a block diagram illustrating another exemplary image decompression system 500. In one aspect, image decompression system 500 may be an exemplary implementation of image processing system 105 of FIG. 1. In another aspect, image processing system 105 may include image compression system 500 as one system, while also including one or more other systems. For example, image processing system 105 may include both image compression system 400 and image decompression system 500.

As pictured, image decompression system 500 includes a decompression circuit 505, a combine circuit 510, and a noise generator 515. Image decompression system 500 may begin operating on components of an image retrieved from a memory. For purposes of illustration, compressed de-noised image 475, compressed noise dictionary 480, and compressed image segmentation map 485 are fetched from a memory for processing. As pictured, compressed de-noised image 475, compressed noise dictionary 480, and compressed image segmentation map 485 may be received by decompression circuit 505. Decompression circuit 505 may decompress compressed de-noised image 475 to generate, or recover, de-noised image 455, decompress compressed noise dictionary 480 to generate, or recover, noise dictionary 470, and decompress compressed image segmentation map 485 to generate, or recover, image segmentation map 475.

Decompression circuit 505 provides de-noised image 455 to combine circuit 510. Decompression circuit 505 provides noise dictionary 470 and image segmentation map 475 to noise generator 515. Noise generator 515 may generate noise for the various regions of image segmentation map 475. For example, for each region in image segmentation map 475, noise generator 515 may determine, or read, the appropriate noise parameterization for that region. Noise generator 515 obtains the noise parameterization, e.g., the noise function and the parameter(s) for the noise function, from noise dictionary 470. Noise generator 515 generates noise 520 using the obtained noise parameterizations for the different regions of image segmentation map 475. In one example, noise 520 may be a noise image formed of the generated noise for each region specified in image segmentation map 475.

Noise 520 approximates noise component 460 of FIG. 4. For example, the texture of noise 520, when rendered to, or combined with, the de-noised image 455, approximates the texture of noise component 460. It should be appreciated, however, that noise 520, which is generated from noise generator 515 using one or more noise parameterizations, is not identical to noise component 460.

Combine circuit 510 receives de-noised image 455 and noise 520. Combine circuit 510 may combine de-noised image 455 with noise 520 to generate a constructed image 550. In one example, combine circuit 510 may add noise 520 to de-noised image 455. Within constructed image 550, the textured regions approximate the textured regions of original image 450, but are not identical. Rather, since noise 520 has same or similar characteristics as noise component 460, the textures within constructed image 550 appear similar to those of original image 450. For example, a region of original image 450 that includes grass will appear as grass in constructed image 550. The position of each blade of grass in the region, however, may differ from that of original image 450.

In another embodiment, image decompression system 500 may generate a portion of constructed image 550. For example, rather than generating a complete image, image decompression system 500 may generate a particular portion of constructed image 550. The portion may be a particular region or combination of two or more regions (or partial regions such as a sub-region having a particular texture) as the case may be.

Figure 6:
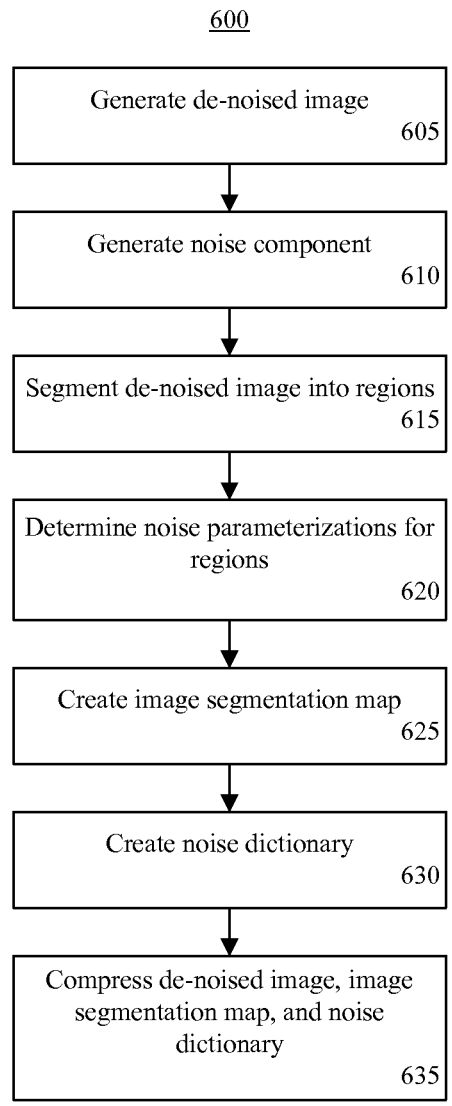
FIG. 6 is a flow chart illustrating an exemplary method of operation for an image processing system.

FIG. 6 is a flow chart illustrating an exemplary method 600 of operation for an image processing system. In one example, method 600 may be performed by the system illustrated in FIG. 4. Method 600 may begin in a state where the system has received an original image for processing.

In block 605, the system generates a de-noised image. For example, the system may apply a filter to the original image to remove at least a portion of the noise from the original image thereby resulting in the de-noised image. In block 610, the system may generate a noise component. For example, the system may subtract the de-noised image from the original image thereby generating a noise component. In one aspect, blocks 605 and 610 may be collectively referred to as separating the noise component from the original image.

In block 615, the system may segment the de-noised image into a plurality of different regions. In block 620, the system may determine noise parameterizations for the regions. For example, the system may determine one or more noise parameterizations for each region.

In block 625, the system may create an image segmentation map. The image segmentation map may specify segments, as determined in block 615, and a reference or pointer to a noise parameterization for each segment. As discussed, segments of the de-noised image may correspond to, or be mapped to, regions of the noise component. In one example, regions of the de-noised image may correspond to regions of the noise component on a one-to-one basis.

In block 630, the system may create a noise dictionary. The noise dictionary may be a list of the different noise parameterizations specified within the image segmentation map. In one embodiment, the number of noise parameterizations included in the noise dictionary may be limited. For example, the system may limit the number of noise parameterizations to $2^N$, where "N" is an integer value. The $2^N$ most commonly used noise parameterizations for the original image or for a plurality of different images may be used. For each noise parameterization of a region that is excluded from the noise dictionary, the excluded noise parameterization may be mapped to a closest noise parameterization that is included in the noise dictionary.

For instance, one or more noise parameterizations may be selected for exclusion. The noise parameterizations selected for exclusion may be any noise parameterization not on the list of most common noise parameterizations. The selected noise parameterization(s) may be excluded from the noise dictionary and the image segmentation map. Within the image segmentation map, a reference to a noise parameterization that is in the noise dictionary may be associated with a region otherwise associated with a noise parameterization selected for exclusion. Thus, if a selected region has a noise parameterization that is excluded from the noise dictionary, within the image segmentation map, the selected region is associated, or paired, with a reference to a different noise parameterization that is included in the noise dictionary. The different noise parameterization may be one that is considered closest, or similar to, the excluded noise parameterization.

In block 635, the system may compress the de-noised image, the image segmentation map, and the noise dictionary. In one aspect, a same compression technique may be applied to each of the de-noised image, the image segmentation map, and the noise dictionary. In another aspect, the de-noised image, the image segmentation map, and the noise dictionary may be compressed independently. For example, the system may use any combination of one or more compression techniques to compress the de-noised image, the image segmentation map, and the noise dictionary. In illustration, a first compression technique may be used on one element, while a second and different compression technique is used on the second and third elements. In still another illustration, the compression technique that is used may be selected on a per-element basis where a first compression technique may be used for compressing the noise dictionary; a second and different compression technique may be used for compressing the image segmentation map; and a third compression technique that is different from the first and second compression techniques may be used to compress the de-noised image.

In one embodiment, the system may compress the noise dictionary using minimum or no loss. The system may compress the image segmentation map using lossless compression. The system may compress the de-noised image with a variable rate compressor. It should be appreciated that the examples provided herein are provided for purposes of illustration only and are not intended as limitations of the various embodiments described.

Figure 7:
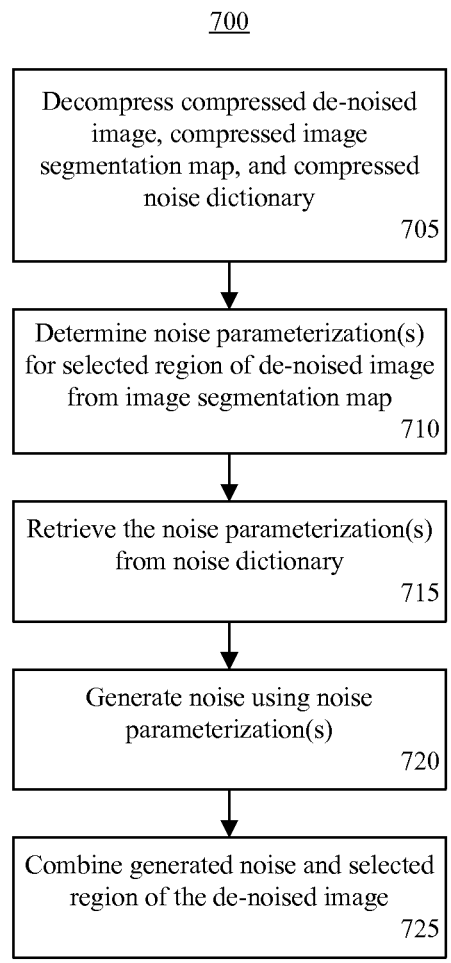
FIG. 7 is a flow chart illustrating another exemplary method of operation for an image processing system.

FIG. 7 is a flow chart illustrating another exemplary method 700 of operation for an image processing system. In one example, method 700 may be performed by the system illustrated in FIG. 5. Method 700 may begin in a state where a compressed de-noised image, a compressed image segmentation map, and a compressed noise dictionary have been retrieved from a memory for processing. In the example of FIG. 7, the system operates on a single region of an image. It should be appreciated that the operations described in FIG. 7, however, may be repeated as may be required and/or performed multiple times in parallel to render one or more additional regions or each other region to generate a constructed image.

In block 705, the system may decompress the compressed de-noised image, the compressed image segmentation map, and the compressed noise dictionary. The system may use any appropriate decompression technique as may be required for each of the aforementioned elements, whether a same decompression technique is used or more than one decompression technique is used. It should be appreciated that the particular manner of decompression will depend upon the manner in which the elements were originally compressed.

In block 710, the system may determine one or more noise parameterizations for a selection region of the de-noised image. The image processing system may look-up the selected region in the image segmentation map and determine the particular noise parameterization(s) associated with the selected region in the image segmentation map.

In block 715, the system may retrieve the noise parameterization(s) for the selected region from the noise dictionary. In block 720, the system may generate noise using the noise parameterization(s). In one aspect, the generated noise may be considered a portion of a noise component, e.g., for the region of the noise component that directly correlates with the selected region of the de-noised image to be rendered.

In block 725, the image processing system may combine the generated noise with the selected region of the de-noised image. The resulting region is a textured version of the region of the de-noised image and may be rendered, or shown, on a display.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

The flowcharts and block diagrams in the Figures illustrate the architecture, functionality, and operation of possible implementations of systems and methods according to various aspects of the inventive arrangements. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts.

The corresponding structures, materials, acts, and equivalents of all means or step plus function elements that may be found in the claims below are intended to include any structure, material, or act for performing the function in combination with other claimed elements as specifically claimed.

A method may include separating a noise component from an original image resulting in a de-noised image, determining a noise parameterization for the noise component, and compressing the de-noised image and the noise parameterization.

The noise parameterization may include a noise function and a parameter value used by the noise function.

The method may include generating noise using the noise parameterization and combining the noise and the de-noised image resulting in a constructed version of the original image.

Separating the noise component from the original image may include filtering the original image resulting in the de-noised image and subtracting the de-noised image from the original image resulting in the noise component.

The method may include segmenting the de-noised image into a plurality of regions. Determining the noise parameterization may include, for regions of the noise component corresponding to regions of the de-noised image, determining a noise parameterization, creating an image segmentation map correlating regions of the de-noised image with the noise parameterization of a corresponding region of the noise component, and creating a noise dictionary specifying the noise parameterizations. Compressing may include compressing the noise dictionary and the image segmentation map.

The de-noised image, the noise dictionary, and the image segmentation map may be compressed independently using a selected compression technique. In one example, a different compression technique may be used to compress each of the de-noised image, the noise dictionary, and the image segmentation map.

Creating the noise dictionary may include excluding a selected noise parameterization from the noise dictionary and the image segmentation map and, within the image segmentation map, associating a reference to a noise parameterization that is in the noise dictionary with a region otherwise associated with the selected noise parameterization.

A system may include a noise processing circuit configured to separate a noise component from an original image resulting in a de-noised image, a noise parameterization circuit configured to determine a noise parameterization for the noise component, and a compression circuit configured to compress the de-noised image and the noise parameterization.

The noise parameterization may include a noise function and a parameter value used by the noise function.

The noise processing circuit may include a filter circuit configured to generate the de-noised image from the original image and a subtraction circuit configured to generate the noise component by subtracting the de-noised image from the original image.

The system may include a segmentation circuit configured to segment the de-noised image into a plurality of regions. The noise parameterization circuit may be configured to generate an image segmentation map using the segmenting of the de-noised image, correlate the regions of the de-noised image with regions of the noise component, determine a noise parameterization for the regions of the noise component, and generate a noise dictionary specifying the noise parameterizations.

The compression circuit may be configured to compress the noise dictionary and the image segmentation map. In one aspect, the compression circuit may be configured to compress the de-noised circuit, the noise dictionary, and the image segmentation map independently. In one example, the compression circuit may use a different compression technique for each of the de-noised image, the noise dictionary, and the image segmentation map.

The noise parameterization circuit may be configured to exclude a selected noise parameterization from the noise dictionary and the image segmentation map, and, within the image segmentation map, associate a reference to a noise parameterization that is in the noise dictionary with a region otherwise associated with the selected noise parameterization.

The system may also include a decompression circuit configured to decompress the de-noised image and the noise parameterization, a noise generator configured to generate noise according to the noise parameterization, and a combine circuit configured to combine the noise generated by the noise generator and at least a portion of the de-noised image.

A system may include a decompression circuit configured to decompress a compressed de-noised image and a compressed noise parameterization for the de-noised image, a noise generator configured to generate noise according to the noise parameterization, and a combine circuit configured to combine the noise generated by the noise generator with at least a portion of the de-noised image.

The decompression circuit may be configured to decompress a compressed noise dictionary and an image segmentation map. The noise dictionary may specify a plurality of noise parameterizations for the de-noised image and the image segmentation map may correlate the plurality of noise parameterizations with a plurality of regions of the de-noised image. The noise generator may be configured to generate noise for a region of the de-noised image using a noise parameterization selected from the plurality of noise parameterizations. The combine circuit may be configured to combine the noise generated by the noise generator and the region of the de-noised image.

The decompression circuit may be configured to decompress the compressed de-noised image, the compressed noise dictionary, and the compressed image segmentation map independently using a selected compression technique. The noise generator may be configured to determine the noise parameterization selected from the plurality of noise parameterizations according to the image segmentation map and retrieve the noise parameterization from the noise dictionary.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    separating a noise component from an original image resulting in a de-noised image;
    segmenting the de-noised image into a plurality of regions;
    determining a noise parameterization for the noise component comprising: for each region of the noise component corresponding to a region of the de-noised image, determining a noise parameterization, wherein the noise parameterization for each region of the noise component corresponding to a region of the de-noised image comprises a noise function and a parameter value used by the noise function;

creating an image segmentation map correlating each region of the de-noised image with the noise parameterization of the corresponding region of the noise component;

creating a noise dictionary specifying a list of different ones of the noise parameterizations specified within the image segmentation map, wherein the image segmentation map specifies for each region of the de-noised image, a reference to the noise parameterization within the noise dictionary for the corresponding region of the noise component; and compressing the de-noised image, the noise dictionary and the image segmentation map.

2. The method of claim 1, further comprising:
generating noise using the noise parameterization corresponding to each region of the de-noised image; and
combining the noise and the de-noised image resulting in a constructed version of the original image.

3. The method of claim 1, wherein the plurality of regions of the de-noised image are irregularly shaped with at least one of the regions differing in shape from another one of the regions.

4. The method of claim 1, wherein a different compression technique is used to compress each of the de-noised image, the noise dictionary, and the image segmentation map.

5. The method of claim 1, wherein creating the noise dictionary comprises:
excluding a selected noise parameterization from the noise dictionary and the image segmentation map; and
within the image segmentation map, associating the region previously associated with the selected noise parameterization with a different noise parameterization that is in the noise dictionary and is similar to the selected noise parameterization.

6. The method of claim 1, wherein a boundary of at least one of the plurality of regions of the de-noised image is determined based upon detected edges within the de-noised image.

7. The method of claim 1, wherein at least one of the plurality of regions of the de-noised image includes a plurality of sub-regions, wherein each of the sub-regions uses a different noise parameterization.

8. A system, comprising:
a noise processing circuit configured to separate a noise component from an original image resulting in a de-noised image;
a segmentation circuit configured to segment the de-noised image into a plurality of regions;
a noise parameterization circuit configured to determine a noise parameterization for the noise component, wherein the noise parameterization comprises a noise function and a parameter value used by the noise function, the noise parameterization circuit being further configured to:
for each region of the noise component corresponding to a region of the de-noised image, determine a noise parameterization;
create an image segmentation map correlating each region of the de-noised image with the noise parameterization of the corresponding region of the noise component; and
create a noise dictionary specifying a list of different ones of the noise parameterizations specified within the image segmentation map; and
a compression circuit configured to compress the de-noised image and the noise parameterization, generating compressed de-noised image and compressed noise parameterization,
wherein the image segmentation map further specifies, for each region of the de-noised image, a reference to the noise parameterization within the noise dictionary for the corresponding region of the noise component.

9. The system of claim 8, wherein the noise processing circuit comprises:
a filter circuit configured to generate the de-noised image from the original image; and
a subtraction circuit configured to generate the noise component by subtracting the de-noised image from the original image.

10. The system of claim 8, wherein the compression circuit is further configured to compress the noise dictionary and the image segmentation map.

11. The system of claim 10, wherein the compression circuit uses a different compression technique for each of the de-noised image, the noise dictionary, and the image segmentation map.

12. The system of claim 8, wherein the plurality of regions of the de-noised image are irregularly shaped with at least one of the regions differing in shape from another one of the regions.

13. The system of claim 8, wherein the noise parameterization circuit is further configured to exclude a selected noise parameterization from the noise dictionary and the image segmentation map, and, within the image segmentation map, associate the region previously associated with the selected noise parameterization with a different noise parameterization that is in the noise dictionary and similar to the selected noise parameterization.

14. The system of claim 8, further comprising:
a decompression circuit configured to decompress the compressed de-noised image and the compressed noise parameterization, generating a decompressed de-noised image and a decompressed noise parameterization;
a noise generator circuit configured to generate noise according to the decompressed noise parameterization corresponding to each region of the de-noised image; and
a combine circuit configured to combine the noise generated by the noise generator circuit and at least a portion of the decompressed de-noised image.

15. The system of claim 8, wherein a boundary of at least one of the plurality of regions of the de-noised image is determined based upon detected edges within the de-noised image.

16. A system comprising:
a decompression circuit configured to decompress a compressed de-noised image and a compressed noise parameterization for the de-noised image, generating a decompressed de-noised image and a decompressed noise parameterization;
a noise generator circuit configured to generate noise according to the decompressed noise parameterization, wherein the decompressed noise parameterization comprises a noise function and a parameter value used by the noise function; and
a combine circuit configured to combine the noise generated by the noise generator circuit with at least a portion of the decompressed de-noised image, wherein the decompression circuit is further configured to decompress a compressed noise dictionary and a compressed image segmentation map, generating a decompressed noise dictionary and a decompressed image segmentation map;

wherein the decompressed noise dictionary specifies a list of different ones of a plurality of noise parameterizations for the decompressed de-noised image;

wherein the decompressed image segmentation map correlates each region of the decompressed de-noised image with the noise parameterization corresponding to the region of the decompressed de-noised image, wherein the decompressed image segmentation map further specifies for each region of the decompressed de-noised image, a reference to the noise parameterization within the decompressed noise dictionary for the corresponding region of the decompressed de-noised image;

wherein the noise generator circuit is configured to generate noise for a region of the decompressed de-noised image using a noise parameterization selected from the plurality of noise parameterizations using the decompressed image segmentation map; and wherein the combine circuit is configured to combine the noise generated by the noise generator circuit and the corresponding region of the decompressed de-noised image.

17. The system of claim 16, wherein:

the noise generator circuit is configured to determine the noise parameterization selected from the plurality of noise parameterizations according to the decompressed image segmentation map and retrieve the noise parameterization from the decompressed noise dictionary.

* * * * *